United States Patent
Maruoka et al.

(10) Patent No.: US 6,602,151 B1
(45) Date of Patent: Aug. 5, 2003

(54) GOLF BALL AND METHOD OF PRODUCING THE SAME

(75) Inventors: Kiyoto Maruoka, Kobe (JP); Kaichiro Wayaku, Amagasaki (JP)

(73) Assignees: Sumitomo Rubber Industries Limited, Kobe (JP); Wayaku Paint Co., Ltd., Amagasaki (JP)

( * ) Notice: Subject to any disclaimer, the term of this patent is extended or adjusted under 35 U.S.C. 154(b) by 121 days.

(21) Appl. No.: 09/586,599

(22) Filed: Jun. 2, 2000

(30) Foreign Application Priority Data

Jun. 4, 1999 (JP) .............................. 11-158574

(51) Int. Cl.$^7$ .............................................. A63B 37/12
(52) U.S. Cl. .................... 473/377; 473/378; 427/387
(58) Field of Search ............................. 473/351, 377, 473/378; 427/387

(56) References Cited

U.S. PATENT DOCUMENTS 5,669,831 A * 9/1997 Lutz ........................... 473/377
5,985,370 A   11/1999 Ohira et al.

FOREIGN PATENT DOCUMENTS

| JP | 60215374 | 10/1985 |
| JP | 4277533 | 10/1992 |
| JP | 5317459 | 3/1993 |
| JP | 9276447 | 10/1997 |
| JP | 10165886 | 6/1998 |

* cited by examiner

*Primary Examiner*—Mark S. Graham
*Assistant Examiner*—Raeann Gorden
(74) *Attorney, Agent, or Firm*—Birch, Stewart, Kolasch & Birch, LLP

(57) ABSTRACT

The present invention provides a method of producing golf balls improved the adhesion between a ball body and a coated film on the ball body without the need of expensive and large scale facilities. The inventive method comprises the steps of: applying an adhesion enhancing agent containing a silyl component and a solvent to a surface of a ball body; drying the coated surface to form an adhesion enhancing layer having the silyl component; and applying a paint to the adhesion enhancing layer. The silyl component is capable of remaining 30 weight % or more after an elapse of one hour at a temperature of 25° C. The method is applicable to the batch operating process of manufacturing golf balls.

7 Claims, 1 Drawing Sheet

GOLF BALL AND METHOD OF PRODUCING THE SAME

This application is based on patent application No. 11-158574 filed in Japan, the contents of which is hereby incorporated by reference.

BACKGROUND OF THE INVENTION

1. Field of the Invention

The present invention relates to a golf ball having excellent adhesion between a ball body and a coated film as the outermost surface layer of the golf ball, and a method of producing the same.

2. Description of the Prior Art

Conventionally, a golf ball is made by coating the surface of a ball body with a white paint or clear paint to form a coated film. The coated film improve cosmetic appearance of the ball and prevent stain from sticking on the surface thereof.

Since a golf ball is used under very severe conditions such as being subject to a great deformation upon impact of a shot and abrasion by sand or other objects, thus strong adhesion is required between the coated film and the ball body.

The surface of the ball body is treated before coating to increase the adhesion between the coated film and the ball body. For a golf ball having an ionomer resin cover as the surface layer of the ball body, such treatments are proposed as flaming process wherein the surface of the ball body is oxidized by burning with flame and plasma treatment process (Japanese Unexamined Patent Publication No.S60-215374). In the case of a golf ball having a rubber layer on the surface of the ball body, such treatments are proposed as immersion active chlorine water (Japanese Unexamined Patent Publication No. 5-317459), immersion in a hydrochloric acid water containing a hypochlorite (Japanese Unexamined Patent Publication No. 4-277533) and immersion in sulfuric acid (Japanese Unexamined Patent Publication No. 9-276447).

Recently lost ball market has been thriving because lost balls is widely used on practice courses. Under these circumstances, longer available period of golf balls and stronger adhesion between the golf ball body and the coated film are required. Strong adhesion is required not only when the golf ball is under dry condition but also under wet conditions such as in the case of falling into water.

However, all treatments in the prior art set forth aim at increasing the physical bonding between the ball body and the coated film by roughing the surface of the ball body, and cannot satisfy the requirement for strong adhesion imposed today, particularly the requirement for strong adhesion under wet conditions.

Moreover, the treatments that employ chlorine water, hydrochloric acid water containing a hypochlorite or sulfuric acid, and the flaming treatment require facilities for protecting operators and therefore have disadvantage in terms of cost. The plasma treatment has also disadvantage also in terms of cost for plasma generating facilities.

Japanese Unexamined Patent Publication No. 10-165886 proposed a method of treating a ball body surface with a diluted solution of a silane coupling agent. The surface treatment can be accomplished by using a simpler and cheaper facility, because it suffices only to dip the ball body in the diluted solution of the silane coupling agent.

However, the surface treatment with a silane coupling agent needs a drying process before application of paint to the treated surface. The drying process is necessary for the solvent used in diluting the silane coupling agent to evaporate almost completely. It is because, when the ball body is coated with the paint while the solvent remains on the surface thereof, the paint cannot dry satisfactorily and paint adhesion becomes weak.

The treatment with silane coupling agent has another problem associated with a batch operating process. The batch operating process is conducted in such a manner that an appropriate number of ball bodies are simultaneously subjected to the surface treatment and then all the surface-treated ball bodies are transferred to a coating process that follows. In the batch operating process, ball bodies that have completed the surface treatment are transferred to the subsequent coating process after being left for about one hour. The interval between the surface treatment and the coating process, i.e. about one hour, is used for vaporizing the diluting solvent, which is convenient in the manufacturing processes.

The silane coupling agent used in the above publications is a monomer silane coupling agent represented by the general formula $(RO)_a-Si(X)_b$, wherein R is an alkyl group, and X is a haloalkyl group, an amino-substituted alkyl group, a (meth)acryl or (meth)acryloxy-substituted alkyl group, a mercapto-substituted alkyl group, or a glycidyl-substituted epoxy group. Silane coupling agents such as vinyltrichlorosilane, γ-chloropropyltrimethoxysilane, vinyltris(β-methoxyethoxy)silane, N-β(aminoethyl)γ-aminopropyltrimethoxysilane and γ-glycidyloxypropyltrimethoxysilane are all highly volatile.

When left for one hour after the surface treatment, not only the solvent but also the silane coupling agent itself volatilizes so that sufficient part thereof does not remain on the surface of the golf ball body. In this case, the expected effect of improving the adhesion of the coated film cannot be obtained despite the surface treatment with the silane coupling agent. Although the drying process may be eliminated by using the silane coupling agent without diluting, a simplified surface treatment process such as immersion and spray coating cannot be employed due to high viscosity of the silane coupling agent. Taking productivity and convenience into consideration, a sequential system where individual golf balls that have been surface-treated are coated one by one is not suitable for manufacturing golf balls.

SUMMARY OF THE INVENTION

It is an object of the present invention to provide a method of producing golf balls improved the adhesion between a ball body and a coated film on the ball body without the need of expensive and large scale facilities. The method is applicable to the batch operating process. Another object of the present invention is to provide a golf ball thus produced.

The inventors have found that the volatility of a silyl compound is associated with the molecular weight and the number of silyl groups contained in one molecule, and completed the present invention.

The inventive method comprises the steps of: applying an adhesion enhancing agent containing a silyl component and a solvent to a surface of a ball body; drying the coated surface to form an adhesion enhancing layer having the silyl component; and applying a paint to the adhesion enhancing layer. The silyl component is capable of remaining 30 weight % or more after an elapse of one hour at a temperature of 25° C. It is preferred that the silyl component include at least 50% by weight of a silyl compound (P) with respect to a total weight of the silyl component, the silyl compound (P) is represented by the following formula (1) and has a weight-average molecular weight of 300 or higher:

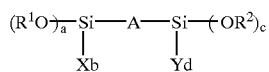
(1)

(wherein $R^1$ and $R^2$ are the same or different and each represents a saturated alkyl group having 1 to 3 carbon atoms; X and Y each represents an organic group having an amino group, an imino group or an epoxy group in a molecule; "a" and "c" are integers of 2 or 3, and "b" and "d" are integers of 0 or 1, with a proviso that a, b, c and d satisfy the following relations: a+b=3 and c+d=3; and "A" is a divalent residue containing at least one selected from the group consisting of an amide group, an imino group, a tertiary amino group and an alkylene group).

According to the present invention, there is also provided a golf ball which comprises a ball body, an adhesion enhancing layer containing a silyl component formed on the ball body, and a coated film formed on the adhesion enhancing layer. The silyl component is capable of remaining 30 wt % or more after an elapse of one hour at a temperature of 25° C.

The present invention also provides a golf ball which comprises a ball body, an adhesion enhancing layer formed on the ball body which contains a silyl compound (P) represented by the following formula (1) and having a weight-average molecular weight of 300 or higher, and a coated film formed on the adhesion enhancing layer.

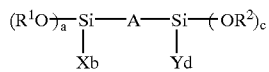
(1)

(wherein $R^1$ and $R^2$ are the same or different and each represents a saturated alkyl group having 1 to 3 carbon atoms; X and Y each represents an organic group having an amino group, an imino group or an epoxy group in a molecule; "a" and "c" are integers of 2 or 3, and "b" and "d" are integers of 0 or 1, with a proviso that a, b, c and d satisfy the following relations: a+b=3 and c+d=3; and A is a divalent residue containing at least one selected from the group consisting of an amide group, an imino group, a tertiary amino group and an alkylene group).

These and other objects, features, aspects, and advantages of the present invention will become more apparent from the following detailed description of the preferred embodiments/examples with the accompanying drawings.

DESCRIPTION OF THE PREFERRED EMBODIMENTS

Figure 1:
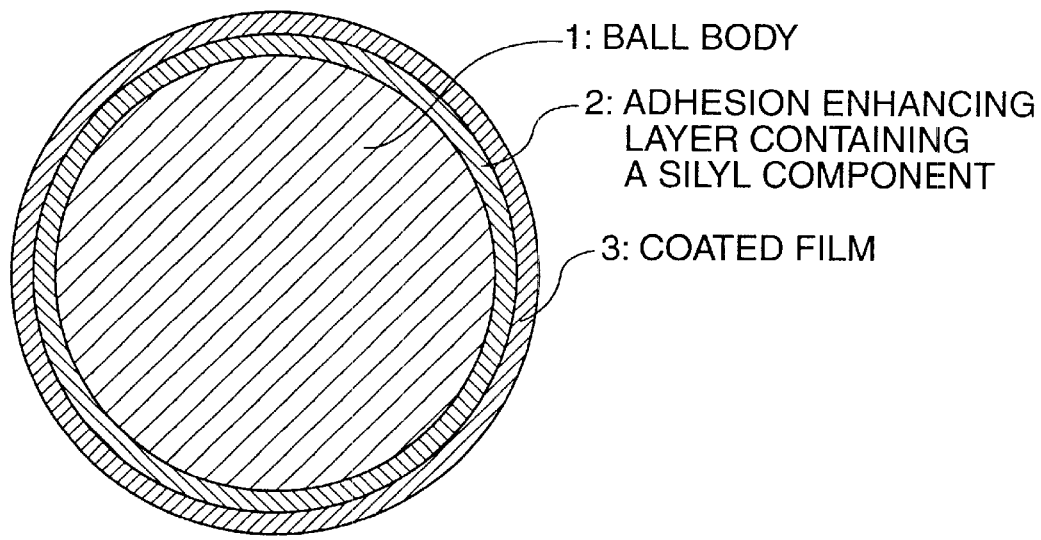
FIG. 1 is a schematic diagram showing the structure of a golf ball of the present invention.

The present invention provides a method of producing a golf ball which comprises ball body 1, adhesion enhancing layer 2 formed on the ball body 1, and coated film 3 formed on the adhesion enhancing layer 2 as shown in FIG. 1. The adhesion enhancing layer 2 is formed by applying an adhesion enhancing agent to the surface of the ball body 1 and drying the coated surface. The coated film 3 is formed by applying a paint to the adhesion enhancing layer 2.

The adhesion enhancing agent used in the present invention contains a solvent and a silyl component being capable of remaining 30 wt % or more after an elapse of one hour at a temperature of 25° C.

A silyl component has generally such high viscosity that it is consequently difficult to apply to a ball body individually and to form a adhesion enhancing layer having a uniform thickness. Consequently a silyl component is diluted with an organic solvent. The diluting solvent is volatilized before applying a paint (this process is referred to as drying). The drying process corresponds to a period required for almost all of the organic solvent included in the adhesion enhancing agent to volatilize. In case of the batch operating process for a method of producing golf balls, it is advantageous to use a time interval of about one hour, after treating a batch of bodies with the adhesion enhancing agent and before applying the paint to the treated surface, for the drying process.

On the other hand, the silyl component must remain and contribute to the improvement of the adhesion of the coated film 3 after undergoing the drying process. The silyl component is required to remain after an elapse of one hour at 25° C. in an amount of 30% by weight or more, preferably 50% by weight or more, and more preferably 70% by weight or more with respect to a total of the silyl component contained in the adhesion enhancing agent.

In order to meet these requirements, preferred is that the silyl component include a silyl compound (P) represented by the following formula (1) and having a weight-average molecular weight of 300 or higher.

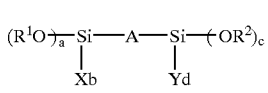
(1)

$R^1$ and $R^2$ are the same or different and each represents a saturated alkyl group having 1 to 3 carbon atoms. X and Y each represents an organic group having an amino group, an imino group or an epoxy group in a molecule. "a" and "c" are integers of 2 or 3 and "b" and "d" are integers of 0 or 1, with a proviso that a, b, c and d satisfy the following relations: a+b=3 and c+d=3. And "A" is a divalent residue containing at least one selected from the group consisting of an amide group, an imino group, a tertiary amino group and an alkylene group.

Since the silyl compound (P) has an alkoxy group moiety represented by $(OR^1)$ in the formula (1), the silyl compound (P) has an affinity for both of the ball body 1 and the coated film 3, resulting in increasing the adhesion between the ball body 1 and the coated film 3. The larger the number of silyl groups contained in one molecule, the higher the weight-average molecular weight, the more hardly the silyl compound volatilizes. Preferable molecular weight of the silyl compound (P) is 500 or higher. The upper limit of the weight-average molecular weight of the silyl compound (P) is preferably 2000, and more preferably 1500. This is because the number of functional groups per one molecule tends to decrease with the increase of the molecular weight, thereby to lower the effect of increasing the adhesion.

The silyl compound (P) can remain on the ball body surface after drying process in a higher ratio than a monomer silane coupling agent, conventionally used as a silane coupling agent. The monomer silane coupling agent is represented by $(RO)_a$—Si—$(X)_b$ and has weight-average molecular weight of about 100 to 250.

In order to adjust the molecular weight of the silyl compound (P) within the above range, the silyl compound (P) has 2 or more Si atoms, preferably from 3 to 6 Si atoms, and more preferably from 3 to 4 Si atoms in one molecule, namely the silyl compound (P) is an oligomer silane coupling agent having 2 to 6 Si atoms. In the formula (1), "A" may be an organic group having a divalent residue capable of bonding with Si atoms at both terminal ends, and Si atoms at both terminal ends may be bonded each other through an amide bond (—CONH—) or a siloxane bond (Si—O—Si). Alternatively, they may be bonded each other through an imino group, a tertiary amino group and an oxy group that are represented by the formulas (4) to (6).

$$—C_xH_{2\bar{x}}—\underset{H}{N}—C_yH_{2\bar{y}}— \quad (4)$$

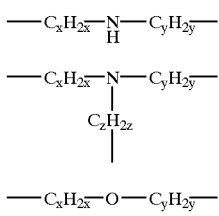

(5)

$$—C_xH_{2\bar{x}}—O—C_yH_{2\bar{y}}— \quad (6)$$

In the formulas (4) to (6), x, y and z are integers of 1 to 3.

In case the silyl compound (P) is an oligomer silane coupling agent having three or more Si atoms in one molecule, "A" is an atomic group containing an alkoxy-substituted silyl group bonded with at least one alkoxy group and a Si atom in "A" and a Si atom at a terminal end may be bonded each other through an amide bond (—CONH—) or a siloxane bond (Si—O—Si), or bonded each other through an imino group, a tertiary amino group and an oxy group that are represented by the formulas (4) to (6). Furthermore, "A" is not limited to a non-branched atomic group and may be a branched atomic group. In case of the branched atomic group, a Si atom may be contained in the side chain moiety formed by branching. For example, an imono group, a tertiary amino group, an oxy group or an alkylene group may be contained in the principal chain, and an alkoxy-substituted silyl group may be contained in the side chain. Even in case the alkoxy-substituted silyl group is contained in the side chain, the imono group, tertiary amino group, oxy group or alkylene group may be contained in the side chain.

The silyl compound (P) is obtained by reacting a compound ($M_1$) represented by the following formula (2) with a compound ($M_2$) represented by the following formula (3) to form dimer to hexamer (hereinafter the compound ($M_1$) and the compound ($M_2$) are referred to as "monomer silyl compound" or "monomer silane coupling agent" sometimes to distinguish from the silyl compound (P)).

In the formulas (2) and (3), $R^1$ and $R^2$ may be the same or different and each represents a saturated alkyl group having 1 to 3 carbon atoms. "m" and "p" each represents an integer of 1 or 2, and "n" and "q" are integers of 2 or 3, with a proviso that m, n, p and q satisfy the following relations: m+n=4 and p+q=4.

$Z^1$ is an organic group having at least one amino or imino group in a molecule, and examples thereof include organic group wherein an alkylene group is bonded with an amino group; organic group wherein a hydrocarbon group such as alkyl group and phenyl group is imino-bonded; dimer or trimer of a lower alkylamine such as methylamine and ethylamine; and organic group wherein a hydrocarbon group to which two kinds of alkylene groups are ether-bonded is bonded with an amino group.

$Z^2$ is an organic group having an epoxy group in a molecule. Specific examples thereof include organic group wherein a double bond moiety of cyclooctene bonded to an alkylene group is epoxidated; and organic group wherein a hydrocarbon group to which two kinds of alkylene groups are ether-bonded is bonded with an epoxy group.

As the compound ($M_1$) represented by the formula (2), there can be used those known generally as the silane coupling agent, and specific examples thereof include γ-aminopropyltrimethoxysilane, γ-aminopropyltriethoxysilane, N-phenyl-γ-aminopropyltrimethoxysilane, N-β(aminoethyl) γ-aminopropylmethyldimethoxysilane, N-β(aminoethyl) γ-aminopropyltrimethoxysilane, and N-β(aminoethyl) γ-aminopropyltriethoxysilane. As the compound ($M_2$) represented by the formula (3), there can be used those known generally as the silane coupling agent, and specific examples thereof include β(3,4 epoxycyclohexyl) ethyltrimethoxysilane, and dimer or trimer of propylene oxide, such as γ-glycidyloxypropyltrimethoxysilane, γ-glycidoxypropylmethyldiethoxysilane and γ-glycidoxypropyltriethoxysilane.

In case the silyl compound (P) is synthesized by reacting the compound ($M_1$) with the compound ($M_2$), compounds ($M_1$) and compounds ($M_2$) may be used alone or in combination thereof, respectively.

The compound ($M_1$) and the compound ($M_2$) may be converted into a silyl compound (P) in the form of a dimer or oligomer by a silanol bond formed by water-eliminating condensation, or converted into a silyl compound (P) whose molecular weight has been increased by bonding an epoxy group with an amino or imino group through an alkyl group containing an imino or tertiary amino group.

The reaction conditions (e.g. catalyst, reaction temperature, etc.) for obtaining the silyl compound (P) may be appropriately selected according to the chemical structure of the silyl compound (P) to be obtained.

According to the preferable embodiment of the present invention, the silyl component include 50% by weight or higher, and more preferably 75% by weight or higher of the silyl compound (P) with a respect to a total weight of the silyl component. A mixture of two or more silyl compounds (P) having different chemical structure may be included in the silyl component. Any silyl compounds other than the silyl compounds (P) may be included in the silyl component as far as the silyl component can remain 30 wt % or more after an elapse of one hour at 25° C. A silyl compound having high volatility such as monomer silane coupling agent, for example, a raw material of the silyl compound (P), may be contained as far as the amount thereof is lower than 50% by weight, and preferably less than 25% by weight.

The adhesion enhancing agent used in the present invention comprises the silyl component described above and an organic solvent for dilution. The organic solvent includes, for example, aromatic solvent such as toluene and xylene; alcohol solvent such as isopropyl alcohol; aliphatic solvent such as hexane; ester solvent such as ethyl acetate; ketones such as methyl ethyl ketone; ether solvent; or a mixture thereof.

Dilution with the organic solvent is preferably done such that concentration of the silyl component is 0.01 wt % or higher, and more preferably within a range from 0.1 to 1 wt %.

The adhesion enhancing agent used in the present invention may include, in addition to the silyl component (silyl compound (P) and monomer silane coupling agent) and the diluting solvent, a paint component that has such functions as primer, surfacer and priming surfacer, a coloring agent and other additive agents. In case a paint component is included, the paint component must be cured while the organic solvent evaporating or when dried at a temperature of 60° C. or lower.

The adhesion enhancing agent is applied to the surface of the ball body 1 and dried to form the adhesion enhancing layer 2. The adhesion enhancing layer 2 contains a silyl component being. capable 30 wt % or more after an elapse of one hour at 25° C., preferably a silyl compound (P). The adhesion enhancing layer 2 may contain, besides the silyl compound (P), other silyl compound and/or a paint component.

While the adhesion enhancing agent may be applied by such methods as brushing, spraying, flow coating and immersion, it is preferable to employ the immersion process that enables coating with a simple facility.

The amount of the adhesion enhancing agent to be applied is sufficient amount to form the adhesion enhancing layer 2 after the drying process. Preferable application amount of the adhesion enhancing agent is at least 0.2 mg, more preferably at least 2 mg, per ball body having a diameter of 41 to 43 mm. In order to determine an appropriate application amount of an adhesion enhancing agent, an evaporating rate of the adhesion enhancing agent under the drying condition should be taken into consideration.

When the silyl component is hardly volatile component, for example the silyl compound (P), the adhesion enhancing agent may be applied to a ball body in such an amount that is equivalent to 0.3 mg or more, preferably 1.2 mg or more, more preferably 2.0 mg or more of the silyl component in the adhesion enhancing agent. When a monomer silane coupling agent is used as a main silyl component, which is highly evaporable and not capable of remaining 30 wt % after an elapse of one hour at 25° C., a large amount of the adhesion enhancing agent must be applied, and application of such a large amount by immersion or spray coating method results in lower productivity or uneven coating and is practically impossible.

In the inventive method of producing a golf ball, drying process is conducted so that most of the solvent, preferably all of the solvent, in the adhesion enhancing agent volatilizes. Drying may be done by leaving the treated ball body with the adhesion enhancing agent at a room temperature so that the solvent and moisture included in the adhesion enhancing agent almost completely volatilize, but hot air may be applied in order to reduce the drying time. Drying process is conducted at a temperature under 60° C., or preferably at about 40° C. for 40 to 70 minutes, in order to avoid such troubles as melting or degradation of the materials of the ball body, e.g. ionomer resin and rubber, because of excessively high temperature. The time interval between an application of the adhesion enhancing agent and an application of the paint in batch operating process, about one hour, can be used for the drying process.

The ball body 1 used in the present invention may be a one-piece golf ball body made by vulcanization molding of rubber, or a two-piece golf ball body comprising a core and a cover wrapping the core. It may also be a multi-piece golf ball body whose core or cover has a multi-layer structure, or a thread-wound golf ball body made by covering a core having a thread rubber layer with a cover. The cover may be an ionomer cover, or may be made from a rigid rubber such as balata.

According to the present invention, a preferable ball body has a surface layer made from a composition containing a compound having a carboxyl group (—COOH) or a carboxy anion (—COO—). As described in detail below, in case the carboxyl group or carboxy anion exists in the surface layer of the ball body 1, it exhibits high chemical affinity with the silyl component contained in the adhesion enhancing layer 2, thereby making it possible to form an ester bond or an amide bond with the silyl component.

The multi-piece golf ball including two-piece golf ball wherein the surface layer of the ball body 1 is an ionomer cover layer is superior in affinity with the adhesion enhancing layer 2 because the ionomer itself has a carboxy anion.

In case of a one-piece golf ball body 1 wherein a diene rubber is crosslinked with a methacrylic acid or an acrylic acid, and/or a metal salt thereof, a carboxyl group (—COOH) or a carboxy anion (—COO—) is contained in the ball body 1. Specific rubber composition for one-piece golf ball body 1, which contains the carboxyl group or carboxy anion, include a rubber composition comprising 100 parts by weight of a diene rubber such as butadiene; and 15 parts by weight or higher, preferably 20 parts by weight or higher and 50 parts by weight or lower, preferably 40 parts by weight or lower of a metal salt of an α,β-unsaturated carboxylic acid as a co-crosslinking agent. The metal salt of the α,β-unsaturated carboxylic acid includes a metal salt of a methacrylic acid or acryic acid, and specific examples thereof include sodium salt (e.g. sodium acrylate, sodium methacrylate, etc.), zinc salt (e.g. zinc acrylate, zinc methacrylate, etc.), and magnesium salt (e.g. magnesium acrylate, magnesium methacrylate, etc.). A white filler is compounded into a rubber composition for a one-piece ball body, and a transparent coated film may be formed on the surface of a ball body made from the rubber composition. It is also possible to form the a white coated film formed on the ball body made from the rubber composition.

A coated film 3 is formed by coating the surface of the adhesion enhancing layer 3 with a paint. The paint used in the present invention is preferably a paint containing a polyol. The paint containing the polyol has high affinity with the silyl component contained in the adhesion enhancing layer 2, particularly an alkoxy group moiety in the silyl compound (P). An OH group of a polyol contained in the paint may react with an alkoxy group in the silyl compound (P) to form an ether bond with the adhesion enhancing layer 2.

A one-pack of the paint having an polyol as well as a two-pack of the paint in separate packages consisting of a principle coating agent having an polyol and a curing agent may be used. A polyurethane paint of a combination of a principle agent of a polyol and a curing agent of an isocyanate is preferably used because of its excellent impact resistance and rub resistance.

The polyol has two or more OH groups in one molecule, and specific examples thereof include diol such as ethylene glycol; triol such as glycerin; polyol such as polyurethane polyol, polyether polyol, acrylic polyol, polyester polyol, and polycarbonate polyol; or a mixture thereof. These polyols preferably have a hydroxyl value within a range from 15 to 130 mgKOH/g. When the hydroxyl value is less than 15 mgKOH/g, the amount capable of contributing to the affinity with the curing agent or silyl compound (P) is too small to obtain a desired strength of the coated film and a desired adhesion to the ball body. On the other hand, when the hydroxyl value exceeds 130 mgKOH/g, it needs longer time to react with the curing agent, resulting in lowering the productivity. Furthermore, crack is liable to occur on impact because of high hardness of the coated film 3.

Preferable isocyanate contained the curing agent includes isocyanates whose principal chain is a saturated aliphatic or alicylic one in view of the weathering resistance. Specific examples include hexamethylene diisocyanate, hydrogenated xylylene diisocyanate, hydrogenated diphenylmethane diisocyanate, and norbornene diisocyanate.

The coated film 3 has the affinity with the adhesion enhancing layer 2, and the adhesion enhancing layer 2 has the affinity with the surface of the ball body 1 as mentioned before. As a consequence, the coated film 3 can exhibit excellent adhesion with the ball body 1 via the adhesion enhancing layer 2.

When the silyl component includes the silyl compound (P) represented by the formula (1) wherein X is an organic group having an amino group, improvement in the adhesion of the coated film can be expected from the formation of urea bond through the reaction between the isocyanate group (—NCO) of the curing agent used in an polyurethane paint and the amino group contained in the silyl compound (P).

The golf ball of the present invention is produced by the method of the present invention, namely a golf ball which comprises the ball body 1, the adhesion enhancing layer 2 formed on the ball body 1, and the coated film 3 formed on the adhesion enhancing layer 2 as shown in FIG. 1. The adhesion enhancing layer 2 includes, as a principal component, a silyl component used in the adhesion enhancing agent. The silyl component is capable of remaining after an elapse of one hour at a temperature of 25° C. According to the preferred embodiment of the present invention, the adhesion enhancing layer 2 contains the silyl compound (P) described above.

Since the golf ball of the present invention has the adhesion enhancing layer 2 that has affinity, including a chemical bond, with both the ball body 1 and the coated film 3, adhesion between the ball body 1 and the coated film 3 is improved and the coated film 3 shows high resistance against peel-off. Moreover, since the adhesion enhancing layer 2 is provided as the interposing layer between the ball body 1 and the coated film 3, even when the ball body 1 and the coated film 3 deform differently from each other upon impact, the adhesion enhancing layer 2 that intervenes therebetween absorbs the difference in deformation and mitigates the effect.

EXAMPLES

The present invention is further illustrated by the following examples. It is to be understood that the present invention is not limited to the examples, and various changes and modifications may be made in the invention without departing from the spirit and scope thereof.

Production of Golf Balls
(I) Production of a Ball Body

A one-piece golf ball body having a diameter of 43 mm and a test piece having a thickness of 2 mm for checker pattern test were made by mixing 100 parts by weight of a high-cis polybutadiene rubber "BR-11" (butadiene rubber whose cis-1,4-bond content is 98% or higher) manufactured by JSR Co., Ltd., 25 parts by weight of zinc acrylate (manufactured by Sanshin Chemicals Co., Ltd.), 27 parts by weight of barium sulfate and 2 parts by weight of dicumyl peroxide (manufactured by Ohuchi Sinko Chemicals Co., Ltd.), followed by compression vulcanization molding at 160° C. for 20 minutes.

A two-piece golf ball body having a diameter of 43 mm which consists of a core and an ionomer cover wrapping the core was made as follows. First, a rubber composition for the core was prepared by mixing 100 parts by weight of a high-cis polybutadiene rubber "BR-11", 25 parts by weight of zinc acrylate (manufactured by Sanshin Chemicals Co., Ltd.), 15 parts by weight of zinc white No.3 (manufactured by Sakai Chemical Industries Co., Ltd.), 5 parts by weight of barium sulfate and 2 parts by weight of dicumyl peroxide (manufactured by Ohuchi Sinko Chemicals Co., Ltd.). The rubber composition was conducted by a compression vulcanization molding at 160° C. for 20 minutes to form a core having a diameter of 38.4 mm. And then the core was covered with a cover material made by mixing 50 parts by weight of HIMILAN 1605 (ethylene-methacrylic acid copolymer-based ionomer neutralized with a sodium ion) manufactured by Mitsui Du Pont Polychemical Co., Ltd., 50 parts by weight of HIMILAN 1706 (ethylene-methacrylic acid copolymer-based ionomer neutralized with a zinc ion) manufactured by Mitsui Du Pont Polychemical Co., Ltd. and 2 parts by weight of titanium oxide to obtain a two-piece golf ball having a diameter of 43 mm. Using this cover material, a test piece having a thickness of 2 mm for checker pattern test was also made.

(II) Treatment of the Surface of a Ball Body

One-piece golf ball bodies or two-piece golf ball bodies thus obtained and the test pieces for checker pattern test were conducted with any of the following treatments (a) to (i). The adhesion enhancing agent was applied in such an amount as the amount of a silyl component shown in Table 1 and Table 2.

(a): KBP43 manufactured by Shinetsu Chemical Industries Co., Ltd. was diluted with isopropyl alcohol to prepare an adhesion enhancing agent. Dilution was conducted so that the concentration of the silyl component (i.e. concentration of solid content) becomes 3% by weight. The ball body was dipped in the adhesion enhancing agent thus prepared, and then dried at 40° C. for one hour. KBP43 is a silyl compound obtained by reacting an amino group-containing silane coupling agent with an epoxy group-containing silane coupling agent, and has a weight-average molecular weight of 930.

(b): The same treatment as in (a) was conducted, except that KBM403 manufactured by Shinetsu Chemical Industries Co., Ltd. was used instead of KBP43. KBM403 is γ-glycidoxypropylmethoxysilane and has a weight-average molecular weight of 236.

(c): The same treatment as in (a) was conducted, except that KBM603 manufactured by Shinetsu Chemical Industries Co., Ltd. was used instead of KBP43. KBM603 is N-β(aminoethyl)γ-aminopropyltrimethoxysilane and has a weight-average molecular weight of 222.

(d): The same treatment as in (a) was conducted, except that a mixture of KBM403 and KBM603 in a ratio of 1:1 was used instead of KBP43.

(e): The same treatment as in (a) was conducted, except that KBM903 manufactured by Shinetsu Chemical Industries Co., Ltd. was used instead of KBP43. KBM903 is γ-aminopropyltrimethoxysilane and has a weight-average molecular weight of 221.

(f): The same treatment as in (a) was conducted, except that KBM703 manufactured by Shinetsu Chemical Industries Co., Ltd. was used instead of KBP43. KBM703 is γ-chloropropyltrimethoxysilane and has a weight-average molecular weight of 199.

(g): The same treatment as in (a) was conducted, except that a mixture of KBP43 and KBM403 in a weight ratio of 2:1 was used instead of KBP43 alone.

(h): The ball body was passed through flame for about 0.1 seconds while rotating, water-cooled, and then dried at 40° C. for one hour.

(i): The ball body was dipped in chlorine water containing 0.3% active chlorine for 20 minutes, washed with water, and then dried at 40° C. for one hour.

Among the above treatments, the treatments (a), (h) and (i) correspond to the treatments for producing the golf ball according to the present invention.

(III) Formation of Coated Film

A two-pack of polyurethane paint consisting of separate packages of a principal agent and a curing agent was used. Polyether polyol having a hydroxyl value of 82 mgKOH/g as the principal agent was mixed with hexamethylene diisocyanate as the curing agent so that NCO:OH is 1.2:1.0 in terms of an equivalent ratio.

The polyurethane paint was applied with an air spray gun after one of surface-treatments (a) to (i) was conducted. The polyurethane paint was applied in such an amount that a resultant film having a thickness of 20 µm was obtained. Then the coated film was cured at 50° C. for 10 hours thereby making two-piece golf balls (No.1 to 12) and one-piece golf balls (No.13 to 24). Golf balls (Nos.1 to 3, 10, 13 to 15 and 22) produced by applying the surface-treatments (a) and (g) correspond to Examples of the present invention, and others correspond to Comparative Examples.

The golf balls thus produced were evaluated for the adhesion between the coated film and the ball body by the following evaluation procedures. The evaluation results of two-piece golf balls are shown in Table 1 and the evaluation results of one-piece golf balls are shown in Table 2.

Procedures for Measurement and Evaluation

① Amount (mg) of the Silyl Component Staying on the Ball body Surface and Remaining Ratio(%)

In respect to the treatments (a) to (g), amount of the silyl components staying on the ball body surface immediately after immersion; that after drying; and remaining ratio after drying with respect to after immersion were determined as follows.

Silyl component amount after immersion=(Weight of golf ball after immersion−Weight of golf ball before immersion)×Proportion of silyl component in adhesion enhancing agent Silyl component amount after drying=Weight of golf ball after drying−Weight of golf ball before immersion Remaining ratio=(Amount after drying÷Amount after immersion)× 100

In the above equation, value of 0.03 is used for the proportion of the silyl component.

② Dynamic Peel-off Resistance

Golf balls produced as described above were tested to evaluate the peel-off resistance of the coated film under dry and wet conditions by the following procedures.

i) Dry Condition

The golf ball was subjected to repetitive shot 50 times using a swing machine manufactured by True Temper Co. at a head speed of 45 m/sec. to evaluate the condition of the coat film of the ball by visual inspection. Condition of the ball in terms of peel-off and crack of the coated film was ranked by the following criteria.

⊚: Neither crack nor peel-off

○: Total area of peels-off is less than 2 mm$^2$.

Δ: Total area of peels-off is 2 mm$^2$ or greater and below 5 mm$^2$.

X: Total area of peels-off is 5 mm$^2$ or greater.

ii) Wet condition

The golf ball was dipped in water for seven days. And then the ball was tested similarly to the dry condition and evaluated for the peel-off resistance.

③ Static Peel-off Resistance

The coated film was evaluated according to the checker pattern test of JIS K5400. Specifically, shallow cuts were made by using a cutter guide in a checker pattern having one hundred squares at 1 mm intervals on a test piece. The coated film was rated in a range from 0 to 10 scores by the following criteria according to the condition of the cut.

10 scores: Every cut is fine and smooth on both sides, with no peel-off at any cross of cuts and in any square.

8 scores: Slight peel-off is observed at crosses of cuts. However there is no square which is entirely peeled-off. A total of peeled-off area is not greater than 5% of the whole coated area of the test piece.

6 scores: Peel-off is observed at both sides of cut and at crosses of cuts. A total of peeled-off area is from 5% to 15% of the whole coated area of the test piece.

4 scores: Extensive peel-off along the cutting line is observed. A total of peeled-off area is from 15% to 35% of the whole coated area of the test piece.

2 scores: Extent of peel-off along the cutting line is greater than that of 4 scores. A total of peeled-off area is from 35% to 65% of the whole coated area of the test piece.

0 score: A total of peeled-off area is 65% of the whole coated area of the test piece.

TABLE 1

| No. | | 1 | 2 | 3 | 4 | 5 | 6 | 7 | 8 | 9 | 10 | 11 | 12 |
|---|---|---|---|---|---|---|---|---|---|---|---|---|---|
| Type of ball | | Two-piece golf ball | | | | | | | | | | | |
| Treatment | Type | a | a | a | b | c | d | e | f | c | g | h | i |
| | Amount after immersion (mg) | 8.8 | 2.3 | 29.6 | 2.0 | 2.4 | 2.2 | 1.9 | 2.0 | 9.2 | 2.6 | — | — |
| | Amount after drying (mg) | 6.8 | 1.6 | 22.8 | 0.1 | 0.2 | 0.1 | 0.2 | 0.1 | 0.6 | 1.3 | — | — |
| | Remaining ratio (%) | 77 | 70 | 77 | 5 | 8 | 5 | 11 | 5 | 7 | 50 | — | — |
| Evaluation of Adhesion | Dry condition | ⊚ | ⊚ | ⊚ | X | X | X | Δ | X | Δ | ⊚ | ○ | X |
| | Wet condition | ⊚ | ⊚ | ⊚ | X | X | X | X | X | X | ○ | ○ | X |
| | Checker pattern test | 10 | 10 | 10 | 0 | 0 | 0 | 2 | 0 | 3 | 10 | 5 | 0 |

TABLE 2

| No. | | 13 | 14 | 15 | 16 | 17 | 18 | 19 | 20 | 21 | 22 | 23 | 24 |
|---|---|---|---|---|---|---|---|---|---|---|---|---|---|
| Type of ball | | One-piece golf ball | | | | | | | | | | | |
| Treatment | Type | a | a | a | b | c | d | e | f | c | g | h | i |
| | Amount after immersion (mg) | 9.1 | 2.1 | 30.7 | 2.1 | 1.9 | 2.2 | 2.3 | 2.1 | 8.8 | 2.4 | — | — |
| | Amount after drying (mg) | 7.0 | 1.7 | 22.2 | 0.1 | 0.1 | 0.1 | 0.3 | 0.1 | 0.5 | 1.2 | — | — |
| | Remaining ratio (%) | 77 | 81 | 72 | 5 | 5 | 5 | 13 | 5 | 6 | 50 | — | — |
| Evaluation of Adhesion | Dry condition | ◉ | ◉ | ◉ | X | X | X | Δ | X | Δ | ◉ | X | ○ |
| | Wet condition | ◉ | ◉ | ◉ | X | X | X | X | X | X | ○ | X | ○ |
| | Checker pattern test | 10 | 10 | 10 | 0 | 0 | 0 | 2 | 0 | 2 | 10 | 0 | 4 |

Evaluation

Table 1 and Table 2 show that the remaining ratio of the silyl component is 50% or higher in the case of treatments (a) and (g) where adhesion enhancing agent include 50% by weight or higher content of KBP43 with respect to a total weight of the silyl component, whereas the remaining ratio is as low as 15% or less in the case of treatment (b) to (f) where the silane coupling agent is used alone.

It is also shown that the golf ball treated using the silyl component of high remaining ratio is superior in dynamic peel-off resistance and static peel-off resistance. This feature was verified in both one-piece golf ball and two-piece golf ball. On the other hand, the treatments (h) and (i) resulted in different effects on the adhesion performance depending on the type of golf ball, while requiring more extensive and expensive facilities than in the case of using the adhesion enhancing agent.

According to the method of producing the golf ball of the present invention, the adhesion enhancing layer can be formed with a simple coating facility such as immersion or spray coating equipment, and the adhesion enhancing agent used in this method can make the silyl component remain even after being left for a certain period of time after application and contribute to the improvement of paint adhesion.

The golf ball of the present invention has excellent peel-off resistance of the coated film since the adhesion enhancing layer containing the silyl compound (P) contributes to the improvement of adhesion between the ball body and the coated film. Moreover, since the adhesion enhancing layer of the present invention can be formed simply by applying the adhesion enhancing agent and drying the coat, large production facilities are not required such as the surface treatments of the prior art, thus reducing the production cost.

The present invention has been described with reference to the present embodiments. Obviously, modifications and alterations will occur to others upon reading and understanding the proceeding detailed description. It is indeed that the present invention be construed as including all such modifications and alterations insofar as they come within the scope of the attended claims or the equivalents thereof.

What is claimed is:

1. A method of producing a golf ball comprising the steps of:

applying an adhesion enhancing agent containing a silyl component and a solvent to a surface of a ball body;

drying the coated surface to form an adhesion enhancing layer having the silyl component; and applying a paint to the adhesion enhancing layer; wherein the silyl component is capable of remaining 30 percent or more after an elapse of one hour at a temperature of 25° C., and wherein the silyl component includes at least 50% by weight, of a silyl component (P) with respect to a total weight of the silyl component, the silyl component (P) is represented by the following formula (1) and has a weight-average molecular weight of 300 or higher:

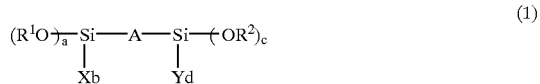

(1)

wherein $R^1$ and $R^2$ are the same or different and each represents a saturated alkyl group having 1 to 3 carbon atoms; X and Y each represents an organic group having an amino group, an imino group or an epoxy group in a molecule; "a" and "c" are integers of 2 or 3 and "b" and "d" are integers of 0 or 1, with a proviso that a, b, c and d satisfy the following relations: a+b=3 and c+d=3; and "A" is a divalent residue containing at least one selected from an amide group, an oxy group, an imino group, a tertiary amino group and an alkylene group.

2. A method of producing a golf ball according to claim 1, wherein said silyl component (P) is produced by reacting a compound ($M_1$) represented by the following formula (2) with a compound ($M_2$) represented by the following formula (3):

(2)

wherein $R^1$ is a saturated alkyl group having 1 to 3 carbon atoms; $Z^1$ is an organic group having an amino group or an imino group in a molecule; and "m" is an integer of 1 or 2 and "n" is an integer of 2 or 3, with a proviso that "m" and "n" satisfy the following relation: m+n=4; and

(3)

wherein $R^2$ is a saturated alkyl group having 1 to 3 carbon atoms; $Z^2$ is an organic group having an epoxy group in a molecule; and "p" is an integer of 1 or 2 and "q" is an integer of 2 or 3, with a proviso that "p" and "q" satisfy the following relaton: p+q=4.

3. A method of producing a golf ball according to claim 1, wherein the drying is conducted so that the solvent is substantially volatilized.

4. A method of producing a golf ball according to claim 1, wherein the drying is conducted at a temperature of 20 to 50° C. for 40 to 70 minutes.

5. A method of producing a golf ball according to claim 1, wherein the ball body has the surface layer made from a resin composition containing an ionomer.

6. A method of producing a golf ball according to claim 1, wherein the ball body is made of a vulcanized rubber composition containing a diene rubber and a metal salt of an α,β-unsaturated carboxylic acid.

7. A golf ball comprising a ball body;

an adhesion enhancing layer on the ball body which contains a silyl compound (P) represented by the following formula (1) and having a weight-average molecular weight of 300 or higher; and a coated film coated on the adhesion enhancing layer,

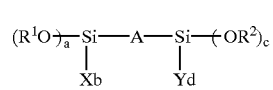
(1)

(wherein $R^1$ and $R^2$ are the same or different and each represents a saturated alkyl group having 1 to 3 carbon atoms; X and Y each represents an organic group having an amino group, an imino group or an epoxy group in a molecule; "a" and "c" are integers of 2 or 3 and "b" and "d" are integers of 0 or 1, with a proviso that a, b, c and d satisfy the following relations: a+b=3 and c+d=3; and "A" is a divalent residue containing at one selected from the group consisting of an amide group, an group, an imino group, a tertiary amino group and an alkylene group).

* * * * *